(12) United States Patent
Manwaring et al.

(10) Patent No.: US 7,124,866 B2
(45) Date of Patent: Oct. 24, 2006

(54) ADAPTIVE ENERGY ABSORBER

(75) Inventors: Marvin V. Manwaring, Clio, MI (US);
Richard K. Riefe, Saginaw, MI (US);
Ray G. Armstrong, Bay City, MI (US);
Lee M. Tinnin, Clio, MI (US);
Ravindra Jwalapathy, Saginaw, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/839,828

(22) Filed: May 6, 2004

(65) Prior Publication Data

US 2005/0247533 A1 Nov. 10, 2005

(51) Int. Cl.
*F16F 7/12* (2006.01)

(52) U.S. Cl. .................... 188/374; 188/371; 280/777

(58) Field of Classification Search ............ 188/374, 188/371, 377, 376; 74/492, 493; 280/777
See application file for complete search history.

(56) References Cited

U.S. PATENT DOCUMENTS

| 4,142,423 A * | 3/1979 | Ikawa ................... 74/492 |
| 4,968,058 A | 11/1990 | Jones .................. 280/777 |
| 5,295,712 A | 3/1994 | Omura ................. 280/777 |
| 5,482,320 A | 1/1996 | Passebecq ............ 280/777 |
| 5,507,521 A | 4/1996 | Steffens .............. 280/775 |
| 5,605,073 A | 2/1997 | Milton et al. ......... 74/492 |
| 5,669,634 A | 9/1997 | Heinzman et al. ..... 280/888 |
| 5,720,496 A | 2/1998 | Riefe et al. .......... 280/775 |
| 6,170,874 B1 | 1/2001 | Fosse ................. 280/777 |
| 6,189,929 B1 | 2/2001 | Struble ............... 280/777 |
| 6,234,528 B1 | 5/2001 | Ben-Rhouma .......... 280/777 |
| 6,322,103 B1 | 11/2001 | Li et al. ............ 280/777 |
| 6,467,987 B1 | 10/2002 | Larsen et al. ........ 403/321 |
| 6,652,002 B1 | 11/2003 | Li et al. ............ 280/777 |
| 6,769,715 B1 * | 8/2004 | Riefe et al. ......... 280/777 |
| 2001/0035643 A1 | 11/2001 | Mueller .............. 280/806 |
| 2002/0020999 A1 | 2/2002 | Duval et al. ......... 280/777 |
| 2003/0075405 A1 * | 4/2003 | Manwaring et al. .... 188/371 |
| 2003/0122363 A1 | 7/2003 | Muller ............... 280/806 |

FOREIGN PATENT DOCUMENTS

FR 2 775 648 9/1999

* cited by examiner

*Primary Examiner*—Thomas Williams
(74) *Attorney, Agent, or Firm*—Michael D. Smith (57) ABSTRACT

An apparatus for absorbing energy includes first and second steering column members connected for sliding movement. A first anvil is associated with one of the first and second steering column members and an energy absorbing member is provided having a first portion that extends around and operable to be drawn over the first anvil in response to the sliding movement between the first and second steering column members. A dead loop is formed in the energy absorbing member between its mounting location and the first anvil and is operative to enable the dead loop to straighten in response to application of an applied force prior to movement of the energy absorbing member across the first anvil.

16 Claims, 6 Drawing Sheets

ADAPTIVE ENERGY ABSORBER

FIELD OF THE INVENTION

The invention relates to an energy absorber and more particularly to an energy absorbing apparatus for absorbing energy at different rates.

BACKGROUND OF THE INVENTION

Steering column assemblies for vehicles often include kinetic energy absorption devices that act to control the collapse of the column in the event of a crash to reduce the likelihood of injury to the driver. One form of an energy absorbing device comprises a metal strap that is bent and drawn over an anvil to absorb kinetic energy of a collapsing column. Examples of this type of energy absorbing device include U.S. Pat. Nos. 6,170,874; 6,189,929; 6,322,103; and 6,652,002.

SUMMARY OF THE INVENTION AND ADVANTAGES

The invention provides an apparatus for absorbing energy and positionable in a collapsible steering column of a vehicle. The energy absorber is deformable in response to an excessive frontal impacting force to the steering column so that injury to the vehicle operator is reduced. The apparatus includes a first steering column member and a second steering column member connected to one another for sliding movement. The apparatus also includes a first anvil associated with one of said first and second steering column members and an energy absorbing member having a first portion that extends around and operable to be drawn over the first anvil in response to the sliding movement between the first and second steering column members. The energy absorbing member also includes a second portion connected to the other of the first and second steering column members and a third portion spaced from one of the first and second portions. The third portion is deformable in response to the sliding movement between the first and second steering column members before the first portion is drawn over the first anvil.

The invention also provides a second apparatus for absorbing energy and positionable in a collapsible steering column of a vehicle. The second energy absorber is deformable in response to an excessive frontal impacting force to the steering column so that injury to the vehicle operator is reduced. The second energy absorber also includes first and second steering column members connected to one another for sliding movement, a first anvil having a first axis and associated with the first steering column member, and a second anvil having a second axis and associated with said second steering column member. The second apparatus also includes an energy absorbing member having a first portion extending around and operable to be drawn over the first anvil about the first axis and a second portion extending around and operable to be drawn over the second anvil about the second axis wherein the first and second axis are transverse with respect to one another.

The present invention provides the advantage of broadening the spectrum of accident parameters that may be used to improve the crashworthiness response of an energy-absorbing column. Furthermore, the invention provides a structure that has heretofore been impossible to use to vary the amount of resistance force to various inputs. The structure to vary the resistance force is an enhancement to the performance of the deformable member. The enhancement, for example, can provide a smaller amount of resistance in the case of a less severe collision or a lower weight occupant and a greater amount of resistance in the case of a more severe collision of a larger weight occupant. Also, the present invention will be very useful in applications which had required two straps.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
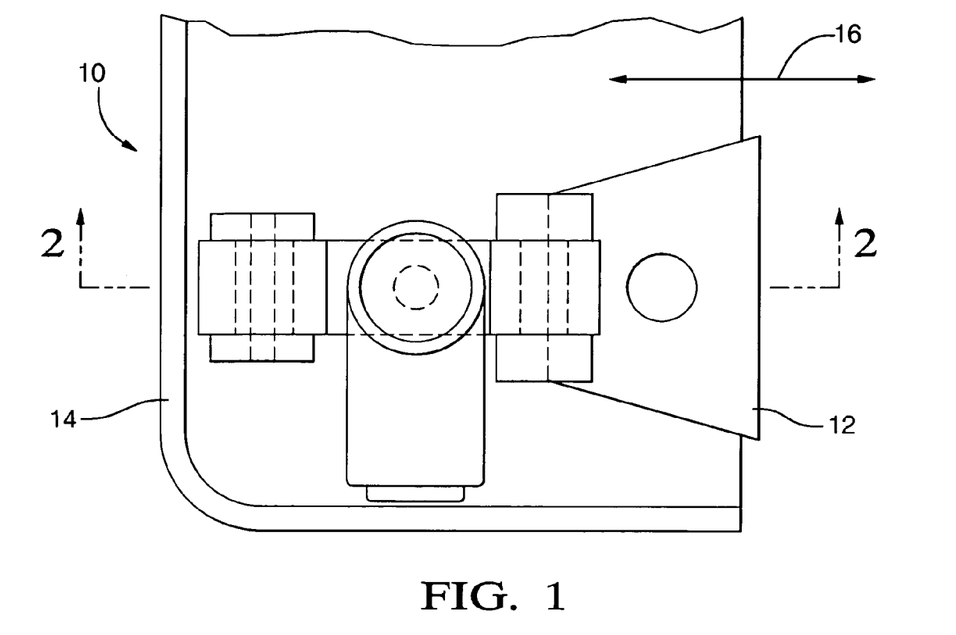
FIG. 1 is a top view of a first exemplary embodiment of the invention.
Figure 2:
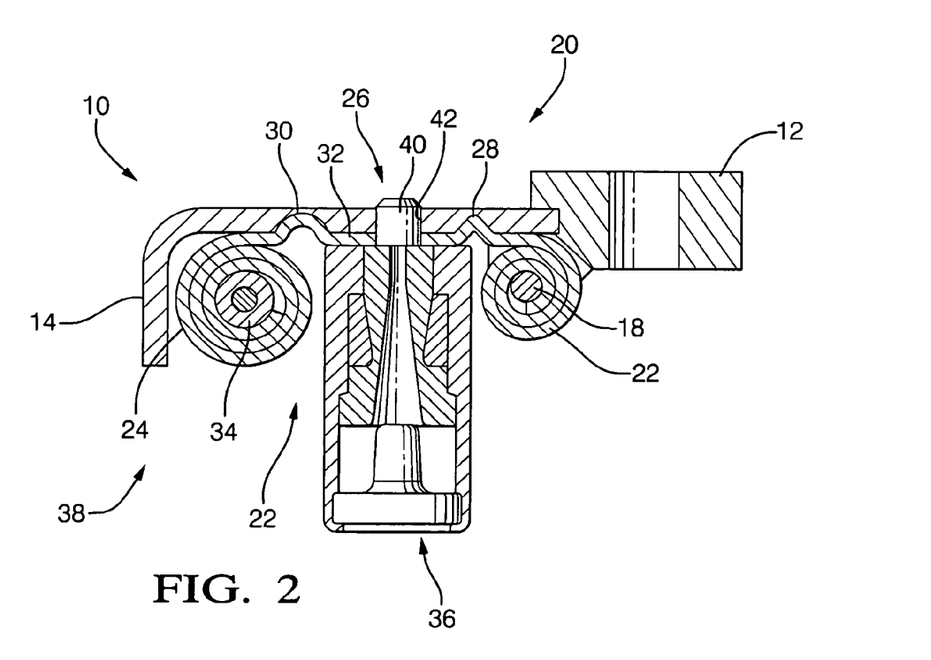
FIG. 2 is a cross-sectional view taken along section lines 2—2 in FIG. 1.

Referring now to FIGS. 1 and 2, in a first exemplary embodiment of the invention, an apparatus 10 absorbs energy in a collapsible steering column of a vehicle by being deformable in response to excessive frontal impacting force to the steering column so that injury to the vehicle operator is reduced. The apparatus 10 includes a first steering column member 12 and a second steering column member 14. One of the first and second steering column members 12, 14 is fixedly connected to the vehicle. The first and second steering column members 12, 14 are connected to one another for sliding movement 16. The first and second steering column members 12, 14 can be inner and outer steering column jackets, upper and lower steering column jackets, brackets, or capsules.

The apparatus 10 also includes a first anvil 18 associated with the first steering column member 12 and an energy absorbing member 20 having a first portion 22 extending around and operable to be drawn over the first anvil 18 in response to the sliding movement 16. The energy absorbing member 20 also includes a second portion 24 connected to the steering column member 14. For example, the apparatus 10 also includes a second anvil 34 associated with the second steering column member 14 and the second portion 24 of the energy absorbing member 20 extends around and is operable to be drawn over the second anvil 34.

The energy absorbing member 20 also includes a third portion 26 spaced from the first portion 22. The third portion 26 is deformable in response to the sliding movement 16 before the first portion 22 is drawn over the first anvil 18 and/or before the second portion 24 is drawn over the second anvil 34.

The third portion 26 defines a crooked path between the first and second portions 22, 24. For example, in the first exemplary embodiment of the invention, the third portion 26 defines a first semi-circular dead loop portion 28. When the first and second steering column members 12, 14 move relative to one another in sliding movement 16, the loop portion 28 is straightened before the first portion 22 is drawn over the first anvil 18 and/or before the second portion 24 is drawn over the second anvil 34.

The third portion 26 also includes a second semi-circular dead loop portion 30 and a substantially straight portion 32 disposed between the first and second loop portions 26, 30. The loop portions 26, 30 would be straightened in response to a sliding movement 16 before the second portion 24 is drawn over the anvil 34 and/or before the first portion 22 is drawn over the anvil 18.

The third portion 26 can also define an elliptical loop 38 for dissipating energy before the energy absorbing member 20 is drawn over one of the anvils 18, 34. For example, in the first exemplary embodiment, the second portion 24 defines the loop portion 38 and the loop portion 38 is deformed to a be a substantially cylindrical loop, similar to the first portion 22, in response to the sliding movement 16 before the first portion 22 is drawn over the anvil 18 and before the second portion 24 is drawn over the anvil 34.

The apparatus 10 also includes a locking device 36 associated with the energy absorbing member 20 to selectively lock the second portion 24 relative to the second anvil 34. The locking device 36 includes a pin 40 that is selectively removable from an aperture 42 defined by the energy absorbing member 20. The energy absorbing member 20 can be drawn over the first anvil 18 or the second anvil 34. In the first exemplary embodiment of the invention, when the pin 40 is positioned in the aperture 42 and sliding movement 16 occurs, the first portion 22 is drawn over the first anvil 18. If the pin 40 were removed and sliding movement 16 occurs, the second portion 24 would be drawn over the second anvil 34 before the first portion 22 would be drawn over the first anvil 18 because the radius of the second anvil 34 is greater than the radius of the first anvil 18.

Figure 3:
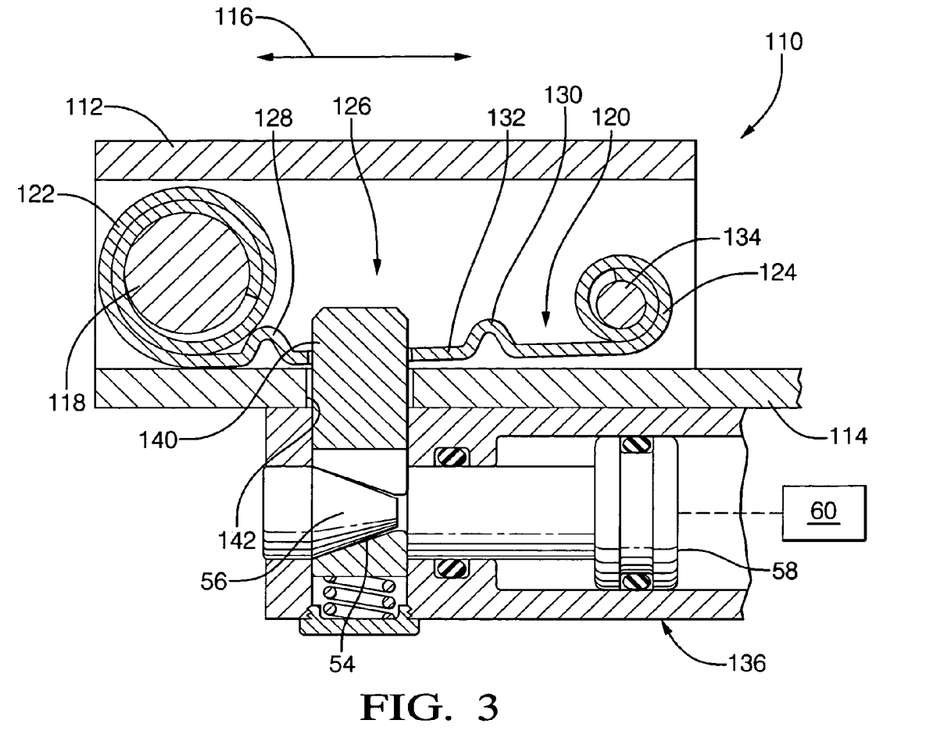
FIG. 3 is a cross-sectional view of a second exemplary embodiment of the invention.
Figure 4:
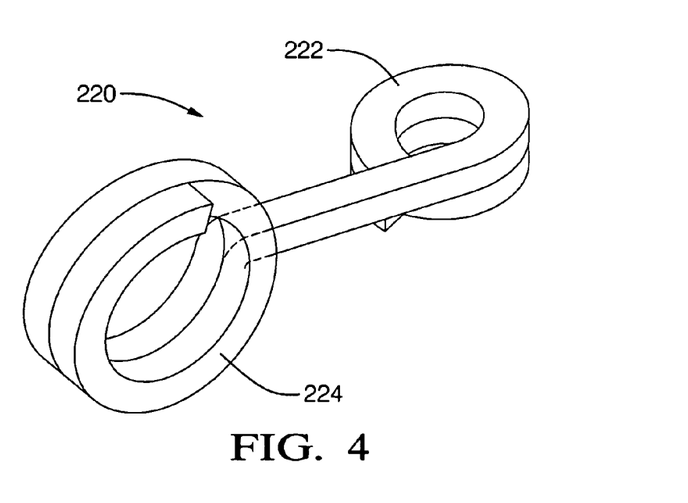
FIG. 4 is a perspective view of an energy absorbing member associated with a third exemplary embodiment of the invention.
Figure 5:
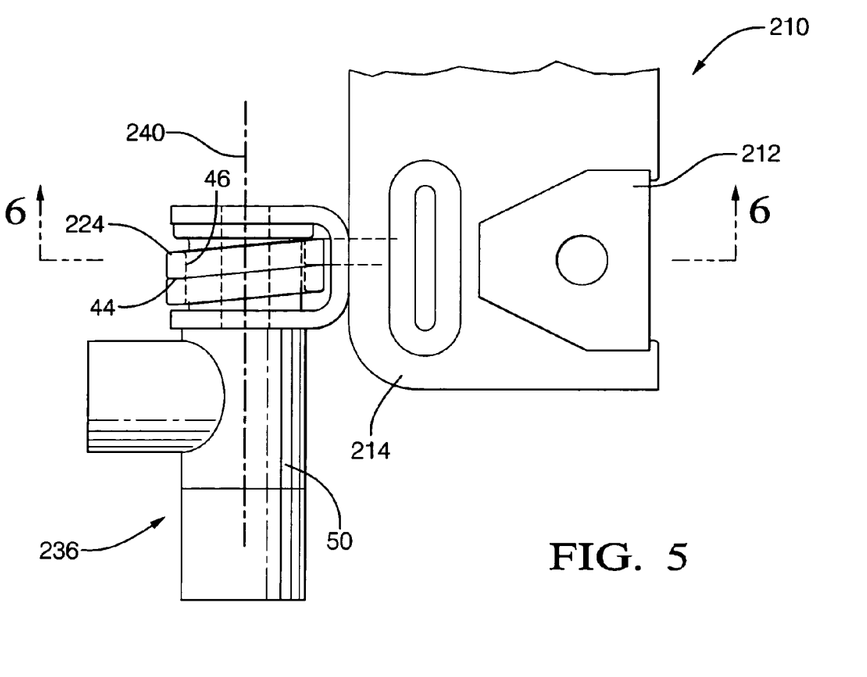
FIG. 5 is a top view of the third exemplary embodiment.
Figure 6:
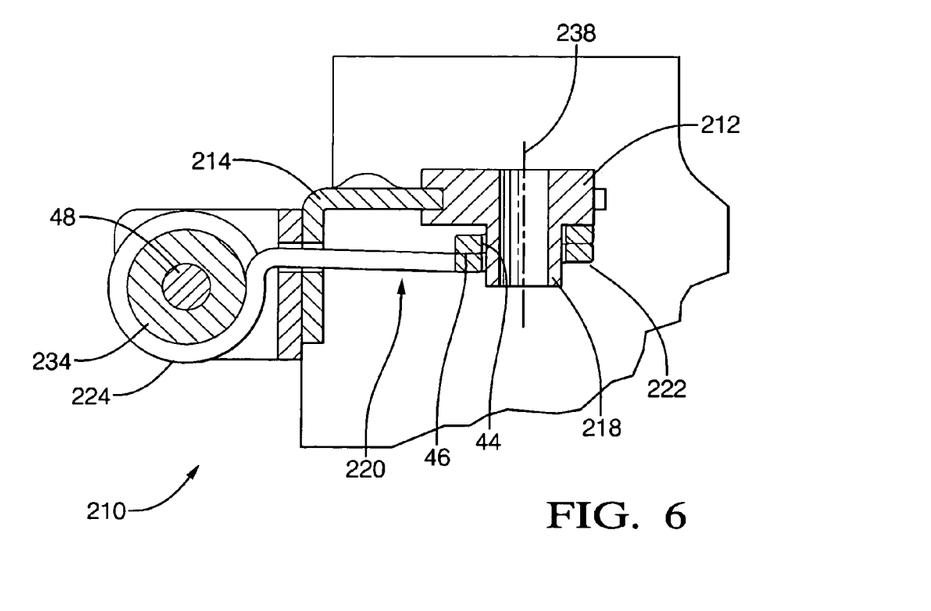
FIG. 6 is a cross-sectional view taken along section lines 6—6 in FIG. 5.

Referring now to FIG. 3, in a second exemplary embodiment of the invention, an apparatus 110 includes a first steering column member 112 and a second steering column member 114 connected for sliding movement 116. A first anvil 118 is associated with the first steering column member 112 and a second anvil 134 is associated with the second steering column member 114. An energy absorbing member 120 includes a first portion 122 extending around and operable to be drawn over the first anvil 118 in response to the sliding movement 116. The energy absorbing member 120 also includes a second portion 124 extending around an operable to be drawn over the second anvil 134 in response to the sliding movement 116.

The energy absorbing member 120 also includes a third portion 126 spaced from the first portion 122. The third portion 126 is deformable in response to the sliding movement 116 before the first portion 122 is drawn over the first anvil 118. The third portion 126 defines a crooked path such as a first semi-circular dead loop portion 128 between the first and second portions 122, 124. The semi-circular loop portion 128 is straightened before the first portion 122 is drawn over the first anvil 118.

The third portion 126 also includes a second semi-circular dead loop portion 130 and a substantially straight portion 126 disposed between the first and second semi-circular loop portions 128, 130. The second semi-circular loop portion 130 is straightened before the second portion 124 is drawn over the second anvil 134.

The locking device 136 includes a pin 140 selectively insertable in an aperture 142. The pin 140 includes a cam follower portion 54 which is moveable by a cam 56. The cam 56 is moved by an actuator 58 controlled by a controller 60. The controller 60 can communicate with sensors (not shown) disposed in the vehicle to selectively withdraw the pin 140 from the aperture 142 by engaging the actuator 58 to move the cam 56 and urge the cam follower portion 54 downward with respect to the orientation of FIG. 3. The sensors communicating with the controller 60 can sense one or more factors including, but not limited to, the speed of the vehicle, the rate of deceleration of the vehicle, a frontal impact of the vehicle, the weight of the driver, the proximity of the driver to the steering wheel, and whether the driver is restrained by a seat belt. The controller 60 can receive communications from the sensors corresponding to sensed conditions and, based on programmable and executable logic stored in memory of the controller 60, selectively engage the actuator 58.

Referring now to FIGS. 4–8, in a third exemplary embodiment of the invention, an apparatus 210 absorbs energy in a collapsible steering column of a vehicle by being deformable in response to an excessive frontal impacting force to the steering column so that injury to the vehicle operator is reduced. The apparatus 210 includes a first steering column member 212 and a second steering column member 214 connected to one another for sliding movement 216. The apparatus 210 also includes a first anvil 218 having a first axis 238 and associated with first steering column member 212. The apparatus 210 also includes a second anvil 234 having a second axis 240 and associated with a second steering column member 214.

The apparatus 210 also includes an energy absorbing member 220 having a first portion 222 extending around and operable to be drawn over the first anvil 218 about the first axis 238 and also includes a second portion 224 extending around and operable to be drawn over the second anvil 234 about the second axis 240. The first and second axes 238, 240 are transverse with respect to one another. For example, in the third exemplary embodiment, the axes 238, 240 are perpendicular to one another. In alternative embodiments of the invention, the axes 238, 240 could extend at a non-perpendicular angle relative to one another.

The energy absorbing member 220 defines a rectangular cross section. A shorter edge 44 of the rectangular cross section contacts the anvil 218 and a longer edge 46 of the rectangular cross section contacts the anvil 234. Because of the rectangular cross-section of the energy absorbing member 220, the energy absorption characteristics associated with drawing the energy absorbing member 220 over the first anvil 218 are different than the energy absorption characteristics associated with drawing the energy absorbing member 220 over the second anvil 234. For example, more energy will be dissipated when the first portion 222 is drawn over the first anvil 218 because the shorter edge 44 faces the first anvil 218. The energy absorption characteristics can be further differentiated by sizing the anvils 218, 234 differently with respect to one another.

Figure 8:
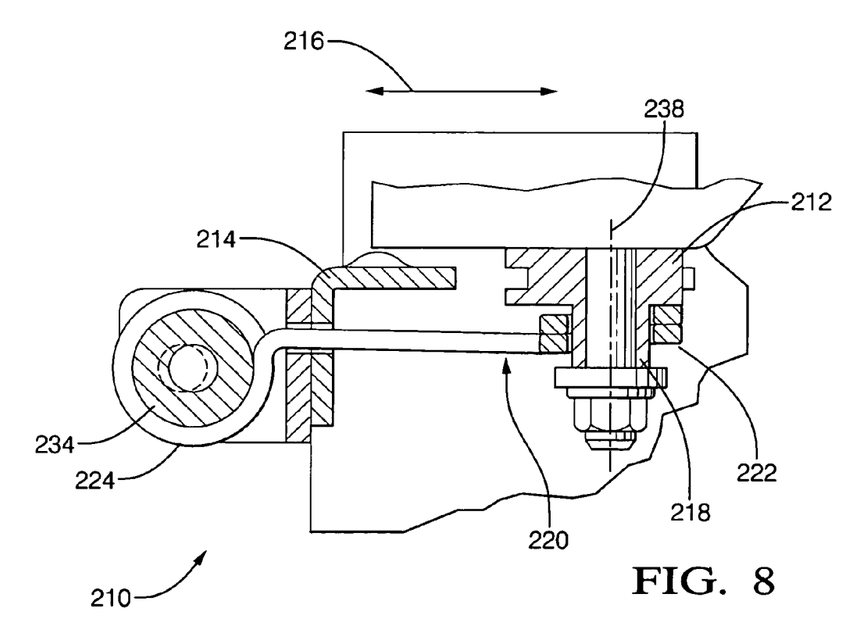
FIG. 8 is a cross-sectional view of the third exemplary embodiment wherein the energy absorbing member is drawn over a first anvil in response to a relatively high impacting force acting on the steering column.
Figure 9:
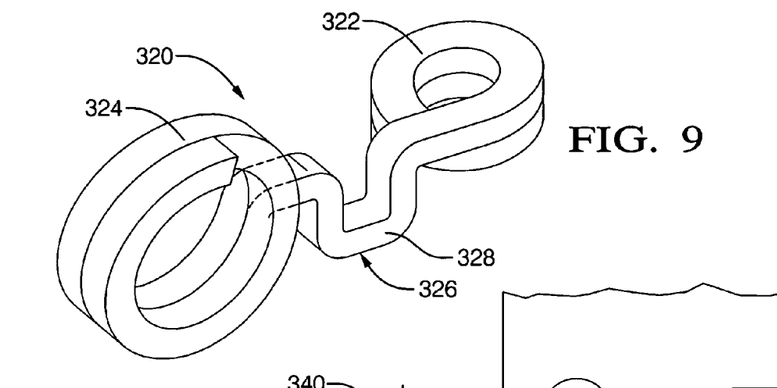
FIG. 9 is a perspective view of an energy absorbing member associated with a fourth exemplary embodiment of the invention.
Figure 10:
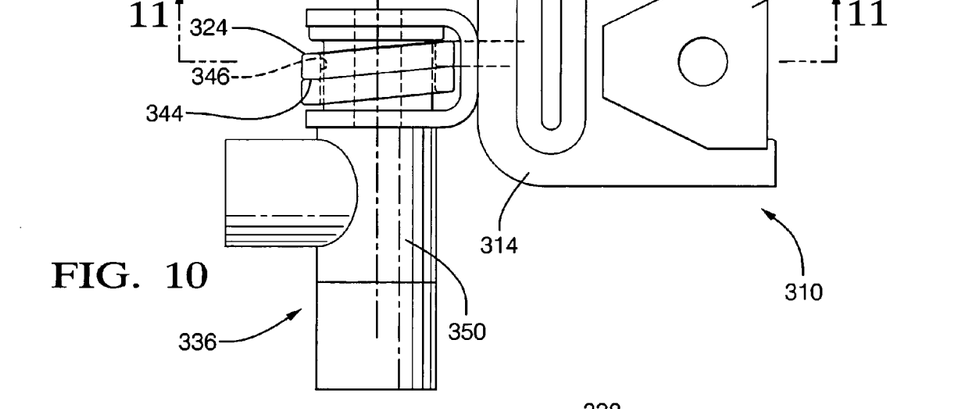
FIG. 10 is a top view of the fourth exemplary embodiment.
Figure 11:
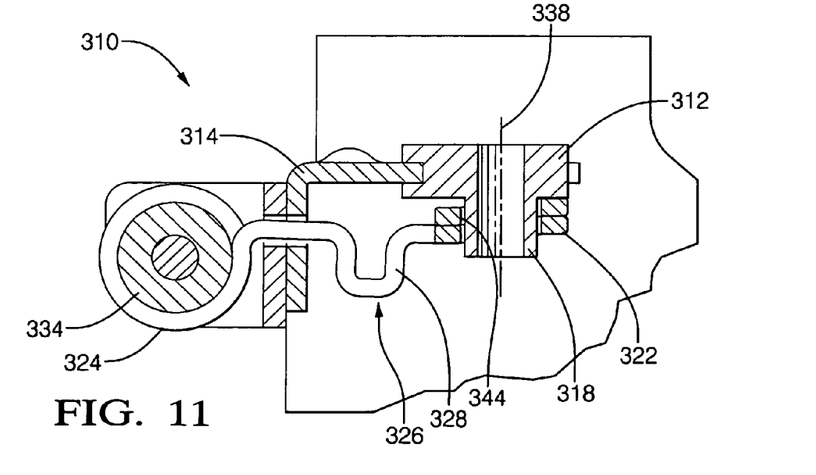
FIG. 11 is a cross-sectional view taken along section lines 9—9 in FIG. 8.

The apparatus 210 also includes a locking device 236 to selectively lock the second portion 224 with respect to the anvil 234. The locking device 236 includes a pin 48 supporting the anvil 234. The locking device 236 also includes a pin releasing device 50 engaged with the pin 48. The pin releasing device 50 can retract the pin 48 from the anvil 234 and allow the anvil 234 to move relative to the second steering column member 214. As best seen in FIG. 8, the energy absorbing member 220 will be pinched between the anvil 234 and the second steering column member 214 when the pin 48 is released.

Figure 7:
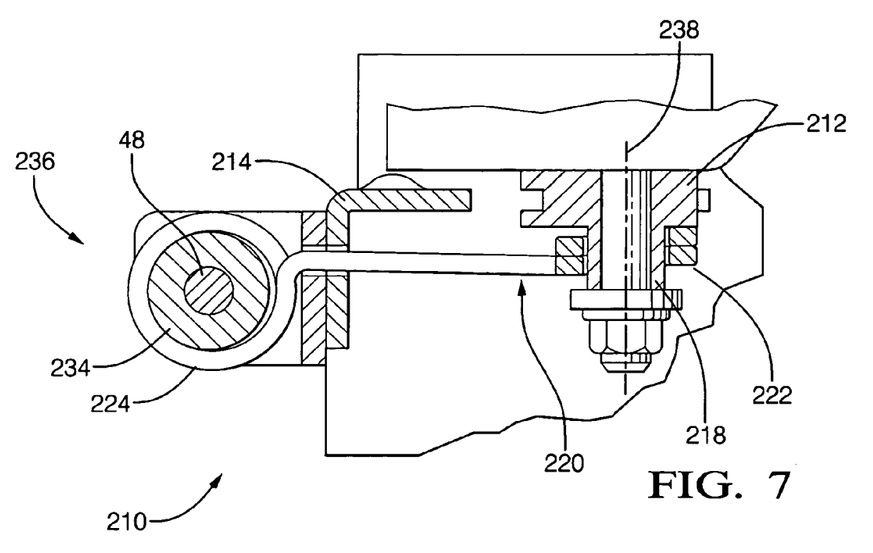
FIG. 7 is a cross-sectional view of the third exemplary embodiment of the invention wherein the energy absorbing member is drawn over a second anvil in response to a relatively low impacting force acting on the steering column.

FIG. 7 shows the first and second steering column members 212, 214 moving relative to one another in sliding movement 216 in response to a relatively low impacting force. The pin 48 is maintained in position and the second portion 224 is drawn over the anvil 234. In FIG. 8, the first and second steering column members 212, 214 are moving relative to one another in sliding movement 216 in response to a relatively high impacting force. The pin 48 has been retracted and the anvil 234 is urged toward the second steering column member 214. As a result, the first portion 222 is being drawn over the first anvil 218.

Referring now to FIGS. 9–13, in a fourth exemplary embodiment of the invention, an apparatus 310 includes a first steering column member 312 and a second steering column member 314 connected to one another for sliding movement 316. The first and second steering column members 312, 314 can be inner and outer steering column jackets, upper and lower steering column jackets, or can be defined as brackets or capsules.

The apparatus 310 also includes a first anvil 318 associated with the first steering column member 312 and having a first axis 338. The apparatus 310 also includes a second anvil 334 associated with the second steering column member 314 and having a second axis 340. The apparatus 310 also includes an energy absorbing member 320 having a first portion 322 extending around and operable to be drawn over the first anvil 318 about the first axis 338 in response to the sliding movement 316. The energy absorbing member 320 also includes a second portion 324 extending around and operable to be drawn over the second anvil 334 about the second axis 340 in response to the sliding movement 316.

The first and second axes 338, 340 are transverse with respect to one another. In the fourth exemplary embodiment of the invention, the axes 338, 340 are substantially perpendicular to one another. However, in alternative embodiments of the invention, an angle of less than 90 degrees can be defined between the first and second axes 338, 340.

The energy absorbing member 320 defines a rectangular cross-section. The rectangular cross-section includes a shorter edge 344 and a longer edge 346. The shorter edge 344 contacts the first anvil 318 and the longer edge 346 contacts the second anvil 334. As a result, the rate of energy absorption associated with drawing the first portion 322 over the anvil 318 is greater than the rate of energy absorption associated with drawing the second portion 324 over the anvil 334 when the anvils 318, 334 are sized similarly. The rate of energy absorption can be further differentiated by sizing the anvils 318, 334 differently.

Figure 12:
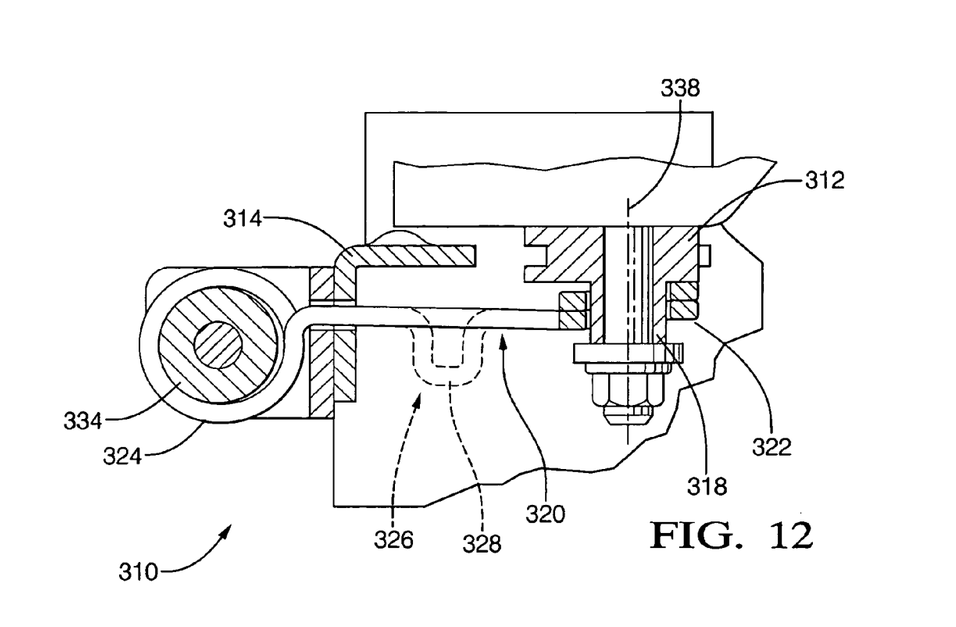
FIG. 12 is a cross-sectional view of the fourth exemplary embodiment in which the energy absorbing member is drawn over a second anvil in response to a relatively low impacting force acting upon the steering column.
Figure 13:
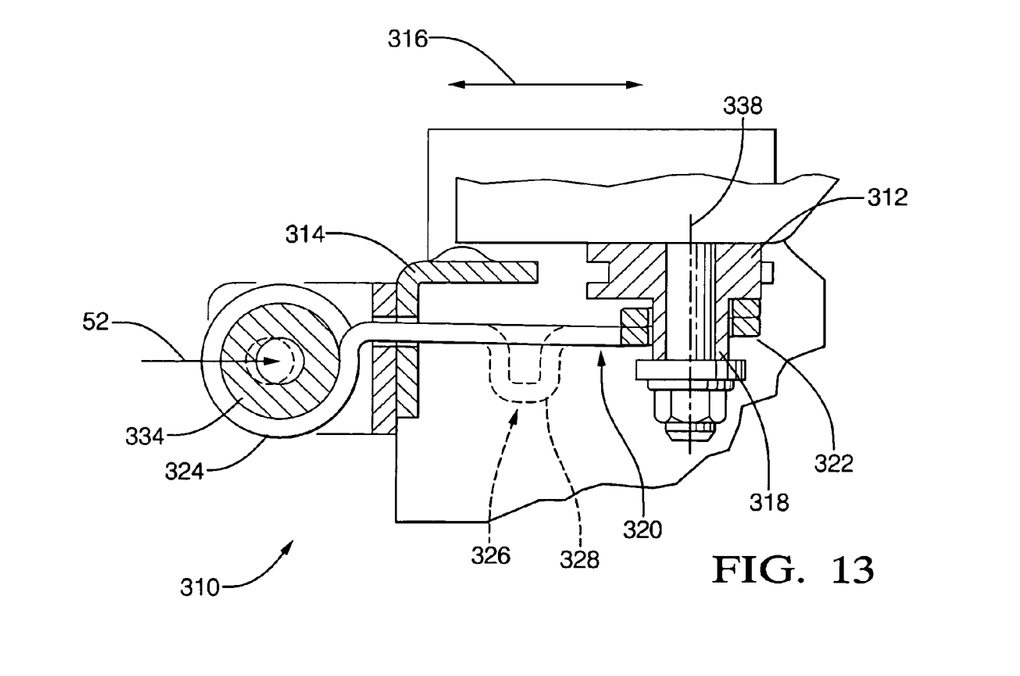
FIG. 13 is a cross-sectional view of the fourth embodiment wherein the energy absorbing member is drawn over a first anvil in response to a relatively high impacting force acting on the steering column.

The apparatus 310 also includes a locking device 336 associated with the energy absorbing member 320 to lock the second portion 324 relative to the second anvil 334. The second anvil 334 is supported on a pin 348. The locking device 336 includes a pin retracting device 350. As best shown in FIG. 12, in response to a relatively low impacting force, the pin 348 is maintained in place to support the second anvil 334 and the second portion 324 is drawn over the anvil 334 to absorb energy. As best shown in FIG. 13, in response to a relatively high impacting force, the pin retracting device 350 retracts the pin 348 and, in response to the sliding movement 316, the second anvil 334 is moved in a direction 52 by the energy absorbing member 320 and the first portion 322 is drawn over the first anvil 318.

The energy absorbing member 320 also includes a third portion 326 spaced from the first portion 322. The third portion 326 is deformable in response to the sliding movement 316 before the first portion 322 is drawn over the first anvil 318 and before the second portion 324 is drawn over the second anvil 334. The third portion 326 defines a crooked path, such as a first semi-circular dead loop portion 328, between the first and second portions 322, 324. As shown in FIGS. 12 and 13, the loop portion 328 is straightened in response to the sliding movement 316.

The size of the loop portion 328 corresponds to the distance along the path of sliding movement 316 associated with the release of the steering column from the vehicle. For example, steering columns are often connected to vehicles with capsules. The capsules provide a rigid connection to the vehicle during normal vehicle handling but will break in response to an impacting force. In current steering columns, the energy absorbing member is not engaged until the capsules have been broken. The present invention provides the third portion 326 of the energy absorbing member 320 to absorb energy during the breaking of the capsule. In other words, the loop portion 328 can be sized such that it defines a crooked path before the impacting force is applied to the steering column but is substantially straight once the capsules that connect the steering column to the vehicle have been broken.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An apparatus for absorbing energy comprising:
   a first steering column member;
   a second steering column member connected to said first steering column member for relative sliding movement therebetween;
   a first anvil associated with said first steering column member;
   a second anvil associated with said second steering column member; and an energy absorbing member having a first portion extending around and operable to be drawn over said first anvil and a second portion extending around and operable to be drawn over said second anvil in response to said sliding movement, and a third portion spaced from and located between said first portion and said second portion and deformable in response to said sliding movement before said first portion is drawn over said first anvil and said second portion is drawn over said second anvil.

2. The apparatus of claim 1 wherein said third portion defines a crooked path between said first and second portions.

3. The apparatus of claim 2 wherein said third portion includes a first semi-circular loop portion.

4. The apparatus of claim 3 wherein said third portion includes a second semi-circular loop portion and substantially straight portion disposed between said first and second semi-circular loop portions.

5. The apparatus of claim 1 wherein said third portion defines an elliptical loop.

6. An apparatus for absorbing energy comprising:
a first steering column member;
a second steering column member connected to said first steering column member for sliding movement;
a first anvil associated with said first steering column member;
an energy absorbing member having a first portion extending around and operable to be drawn over said first anvil in response to said sliding movement and a second portion connected to said second steering column member and a third portion spaced from said first portion and said second portion and deformable in response to said sliding movement before said first portion is drawn over said first anvil;
a second anvil associated with said second steering column member and said second portion of said energy absorbing member is further defined as extending around and operable to be drawn over said second anvil; and
a locking device associated with said energy absorbing member to lock one of said first and second portions relative to the respective anvil.

7. The apparatus of claim 6 wherein said third portion includes a first semi-circular loop portion and a second semicircular loop portion and substantially straight portion disposed between said first and second semi-circular loop portions and wherein said locking device engages said substantially straight portion to lock said energy absorbing member.

8. The apparatus of claim 6 wherein said locking device engages one of said first and second portions to lock said energy absorbing member.

9. The apparatus of claim 6 wherein said first anvil is further defined as having a first axis and said first portion is drawn over said first anvil about said first axis and said second anvil is further defined as having a second axis and said second portion is drawn over said second anvil about said second axis and wherein said first and second axes are transverse with respect to one another.

10. The apparatus of claim 9 wherein said energy absorbing member defines a rectangular cross section.

11. An apparatus for absorbing energy comprising:
a first steering column member;
a second steering column member connected to said first steering column member for sliding movement;
a first anvil having a first axis and associated with said first steering column member;
a second anvil having a second axis and associated with said second steering column member; and
an energy absorbing member having a first portion extending around and operable to be drawn over said first anvil about said first axis and a second portion extending around and operable to be drawn over said second anvil about said second axis wherein said first and second axes are transverse with respect to one another.

12. The apparatus of claim 11 wherein said energy absorbing member defines a rectangular cross section.

13. An energy absorbing apparatus, comprising:
a first member;
a second member;
said first and second members being relatively moveable in response to application of a predetermined moving force to at least one of said first and second members;
first and second anvils respectively mounted on said first and second members;
a plastically deformable energy absorbing member having first and second portions respectively bent around said first and second anvils, said energy absorbing member having a third portion comprising an section extending between said first and second portions; and
a dead loop formed in said extending section of said energy absorbing member in unconfronting relation to any anvil to enable said dead loop to straighten in response to application of said applied force prior to movement of said energy absorbing member across at least one of said first and second anvils.

14. The energy absorbing apparatus of claim 13, further comprising a locking device selectively engaged with said extending section, only one of said first and second energy absorbing member portions being drawn over its respective anvil in response to the application of the predetermined moving force when said locking device is engaged with said extending section.

15. The energy absorbing apparatus of claim 14, wherein, in response to the application of the predetermined moving force when said locking device is not engaged with said extending section, one of said first and second energy absorbing member portions is drawn over its respective anvil before the other of said first and second energy absorbing member portions is drawn over is respective anvil.

16. The apparatus of claim 1 wherein third portion is deformable in response to said sliding movement before said first portion is drawn over said first anvil or said second portion is drawn over said second anvil.

* * * * *